United States Patent
Ura

(10) Patent No.: US 9,437,377 B2
(45) Date of Patent: Sep. 6, 2016

(54) FRAMELESS DISPLAY DEVICE

(71) Applicant: NKK SWITCHES CO., LTD., Kawasaki-Shi, Kanagawa (JP)

(72) Inventor: Hiroki Ura, Kawasaki (JP)

(73) Assignee: NKK SWITCHES CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/591,262

(22) Filed: Jan. 7, 2015

(65) Prior Publication Data
US 2015/0200062 A1 Jul. 16, 2015

(30) Foreign Application Priority Data

Jan. 14, 2014 (JP) ................. 2014-003883

(51) Int. Cl.
| | | |
|---|---|---|
| H01H 1/52 | (2006.01) |
| H01H 3/20 | (2006.01) |
| H01H 9/00 | (2006.01) |
| H01H 13/02 | (2006.01) |
| H01H 9/18 | (2006.01) |
| H01H 13/14 | (2006.01) |
| H01H 13/04 | (2006.01) |
| G02B 5/02 | (2006.01) |

(52) U.S. Cl.
CPC ............ *H01H 13/023* (2013.01); *H01H 9/18* (2013.01); *H01H 13/04* (2013.01); *H01H 13/14* (2013.01); *G02B 5/021* (2013.01); *H01H 2219/036* (2013.01); *H01H 2219/066* (2013.01)

(58) Field of Classification Search
CPC ............ H01H 3/12; H01H 9/00; H01H 9/16; H01H 9/18; H01H 9/181; H01H 9/182; H01H 13/00; H01H 13/04; H01H 13/50; H01H 2003/12; H01H 2003/2219; H01H 2003/014; H01H 2003/016; H01H 2003/036; H01H 2003/037; H01H 2003/038; H01H 2003/039; H01H 2003/04; H01H 2003/054; H01H 2003/062; H01H 2003/0621; H01H 2003/0622; H01H 2003/064; H01H 2003/066; H01H 13/02; H01H 2223/044; H01H 13/14; G02F 1/13
USPC .......................................... 200/314
See application file for complete search history.

(56) References Cited

U.S. PATENT DOCUMENTS

| | | | | |
|---|---|---|---|---|
| 4,987,279 A * | 1/1991 | Hirose | ................... | H01H 9/181 200/312 |
| 2007/0158094 A1* | 7/2007 | Burca | .................. | H01H 9/0235 174/66 |

FOREIGN PATENT DOCUMENTS

| | | |
|---|---|---|
| JP | 2003-016866 | 1/2003 |
| JP | 2003-077357 | 3/2003 |
| JP | 2012-059649 | 3/2012 |

* cited by examiner

Primary Examiner — Renee S Luebke
Assistant Examiner — Anthony R. Jimenez
(74) Attorney, Agent, or Firm — Bacon & Thomas, PLLC

(57) ABSTRACT

There is provided a frameless display device in which a frame on the periphery of a display portion is made invisible. The frameless display device makes the frame on the top surface of a button 8 invisible to display an image on the entire surface of the button 8, wherein the button 8 has a lens 9 and a button cover 8A, wherein a display device 6 is provided below the lens 9, and wherein the lens 9 disposed on top of the button 8 includes a curved surface 9A formed on the periphery of the top surface of the lens 9, a depression formed on the bottom surface of the lens, a step formed at the periphery of the lens, and an inclined surface formed at the step and inclined towards the center of the lens 9.

13 Claims, 4 Drawing Sheets

FRAMELESS DISPLAY DEVICE

BACKGROUND OF THE INVENTION

1. Field of the Invention

The present invention relates to a frameless display device, and in particular, to a miniature switch with a frameless display device.

2. Description of the Related Art

Conventionally, display devices have been proposed as follows, provided with frames that could be disadvantageous:

(1) the push button switch with a narrow-framed display device in which a frame formed on the periphery of a display portion on the top surface of the button is 1 mm or less in width (see Patent Document 1 listed below);

(2) the switch with a display function in which a lens is mounted on top of a display panel, the lens being able to display an enlarged image on the entire top surface of a button (see Patent Document 2 listed below); and (3) the display device in which a film-like bendable display member is disposed on the top surface of a button (see Patent Document 3 listed below).

Patent Document 1: JP 2012-059649 A
Patent Document 2: JP 2003-077357 A
Patent Document 3: JP 4753225 B

SUMMARY OF THE INVENTION

However, these conventional display devices have the following problems:

(1) the device according to Patent Document 1 listed above is only able to make the frame as narrow as possible, but not able to remove the frame completely;

(2) the device according to Patent Document 2 listed above may cause distortion of the image depending on the angle from which the button is seen; and (3) the device according to Patent Document 3 listed above cannot cope with miniaturization because a certain size is required to make the display member bendable (it cannot be bent at the right angle).

In view of the circumstances described above, the present invention is directed to provide a frameless display device in which a frame on the periphery of a display portion is made invisible.

In order to achieve the objective described above, the present invention provides the following:

[1] A frameless display device comprising: a button having a lens and a button cove; and a display device provided below the lens, wherein the lens is disposed on top of the button and comprises a curved surface formed on the periphery of the top surface of the lens, a depression formed on the bottom surface of the lens, a step formed at the periphery of the lens, and an inclined surface formed at the step and inclined towards the center of the lens, and wherein a frame on the top surface of the button is made invisible to display an image on the entire surface of the button.

[2] The frameless display device according to [1] above, wherein the blast processing is performed on the curved surface formed on the periphery of the top surface of the lens.

[3] The frameless display device according to according to [1] or [2] above, comprising a miniature switch that opens/closes an electric circuit by operating the button.

[4] The frameless display device according to [3] above, wherein the miniature switch is a push button switch.

EFFECTS OF THE INVENTION

According to the present invention, the frame on the top surface of the button can be removed practically to display an image on the entire surface of the button.

DESCRIPTION OF EMBODIMENTS

A frameless display device according to the present invention comprises a button having a lens and a button cove, and a display device provided below the lens, wherein the lens is disposed on top of the button and comprises a curved surface formed on the periphery of the top surface of the lens, a depression formed on the bottom surface of the lens, a step formed at the periphery of the lens, and an inclined surface formed at the step and inclined towards the center of the lens, and wherein a frame on the top surface of a button is made invisible to display an image on the entire surface of the button.

Embodiments

Hereinafter, embodiments of the present invention will be described in detail. In the following description, the term "image" includes a character, a picture and a symbol or the like.

Figure 1:
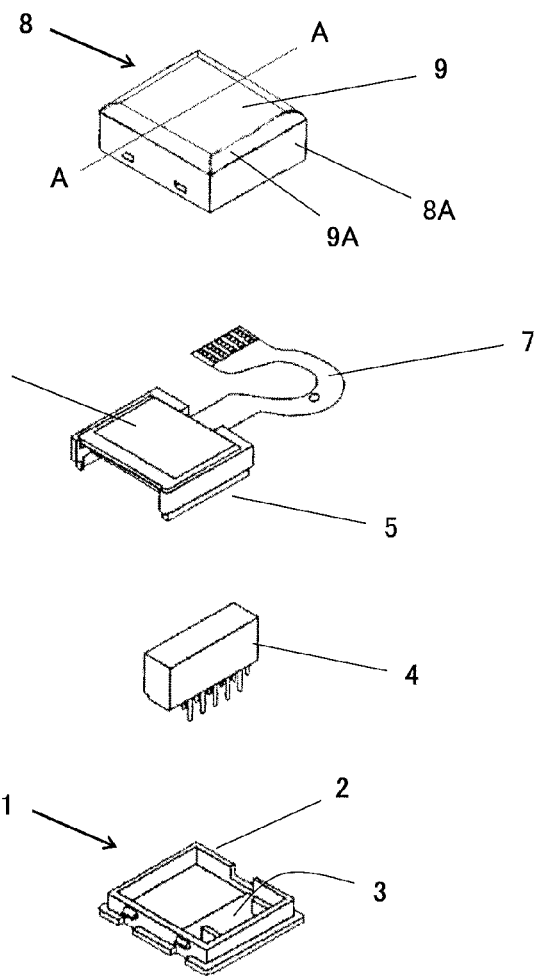
FIG. 1 shows an exploded perspective view of a frameless display device according to an embodiment of the present invention.
Figure 2:
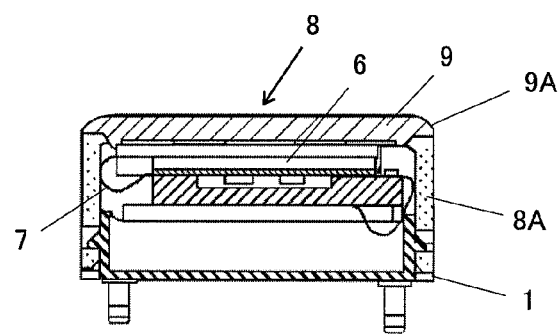
FIG. 2 shows a sectional view taken along line A-A of the frameless display device according to the embodiment of the present invention.
Figure 3:
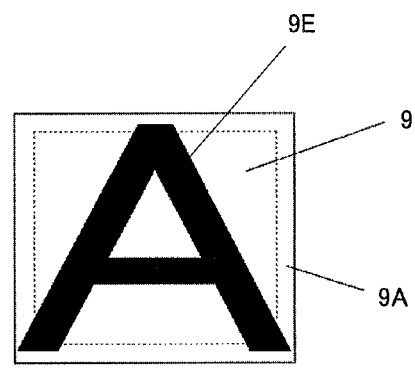
FIG. 3 shows a top view of the frameless display device according to the embodiment of the present invention.
Figure 4:
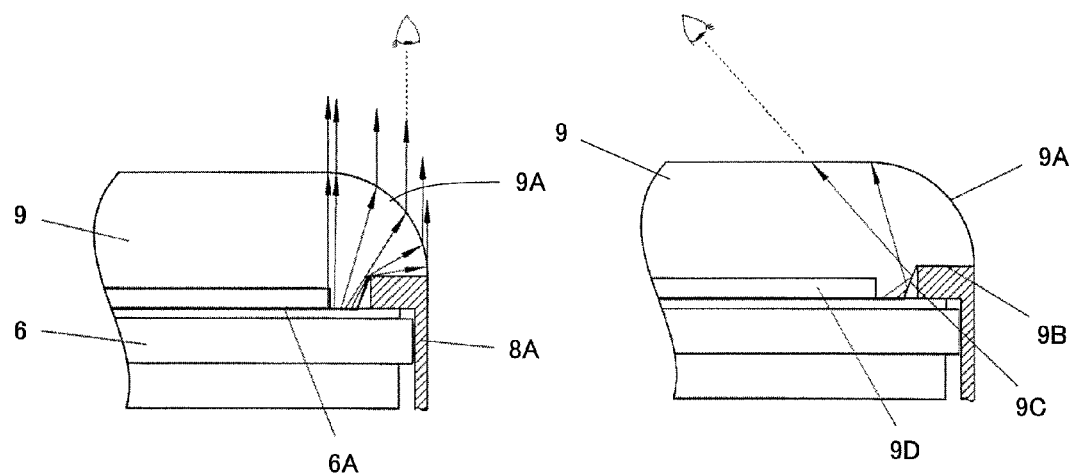
FIG. 4 illustrates display modes of the frameless display device according to the embodiment of the present invention.

FIG. 1 shows an exploded perspective view of a frameless display device according to an embodiment of the present invention. FIG. 2 shows a sectional view taken along line A-A of the frameless display device, FIG. 3 shows a top view of the frameless display device, and FIG. 4 illustrates display modes of the frameless display device, in which FIG. 4(a) shows a mode where the frame portion is viewed from directly above, while FIG. 4(b) shows a mode where the frame portion is viewed from an oblique direction.

These figures show a base 1, a rim member 2, a connector receiver 3, a connector 4, a holder 5, a display device 6, a light-emitting area 6A of the display device, a flexible printed circuit board 7, a button 8, a button cover 8A, a lens 9 placed on the display device 6, a curved surface 9A formed on the periphery of the lens, a step 9B of the lens which abuts against the button cover 8A, an inclined surface 9C of the lens which reflects the emitted light, a depression 9D formed on the bottom surface of the lens, and an image 9E.

Here, the modes of displaying the image by the frameless display device of the present invention will be described with reference to FIG. 4.

When the frame portion is viewed from directly above as shown in FIG. 4(a), the refracted light from the light-emitting area 6A provides an image just above the frame portion, so that the frame is made invisible.

In addition, when the frame portion is viewed from an oblique direction as shown in FIG. 4(b), an image from the light-emitting area 6A reflected at the inclined surface 9C is seen, so that the frame portion is invisible.

Thus, since the frame portion is not visible at the periphery of the button, the frame on the top surface of the button is removed practically, allowing the image to be displayed on the entire surface of the button.

The blast processing is performed desirably on the curved surface 9A formed on the periphery of the top surface of the lens. The blast processing can eliminate the glare at the periphery of the lens to provide the excellent display.

Next, a push button switch as a miniature switch with the frameless display device illustrating another embodiment of the present invention will be described.

Figure 5:
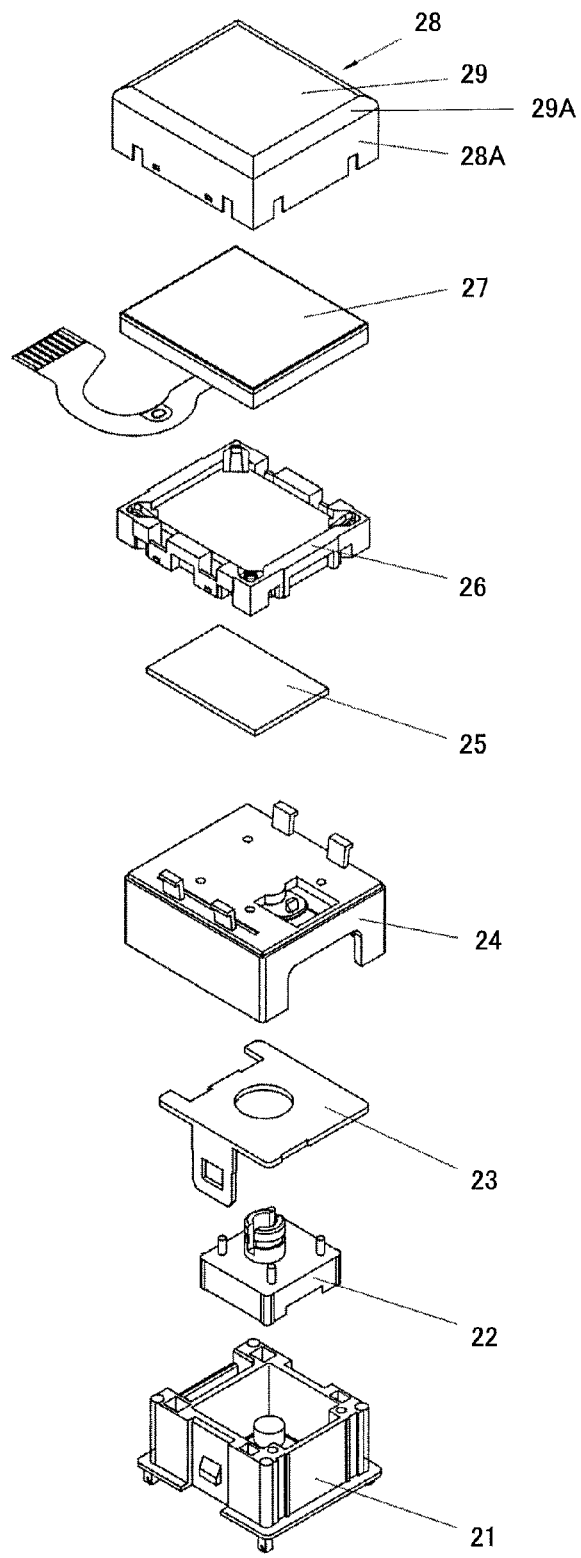
FIG. 5 shows an exploded perspective view of a push button switch as a miniature switch with a frameless display device according to another embodiment of the present invention.
Figure 6:
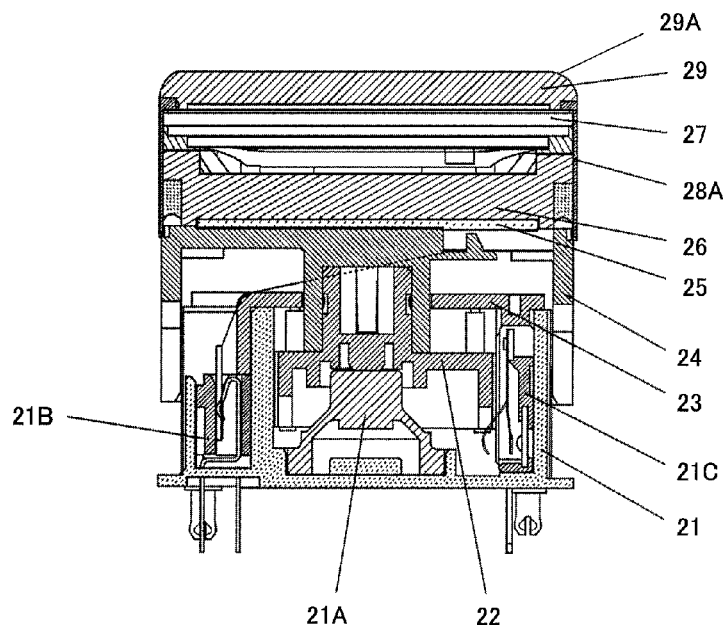
FIG. 6 shows a sectional view of the push button switch as the miniature switch with the frameless display device according to the another embodiment of the present invention.

FIG. 5 shows an exploded perspective view of a push button switch as a miniature switch with the frameless display device according to another embodiment of the present invention, and FIG. 6 shows a sectional view of the push button switch as the miniature switch with the frameless display device.

These figures show a case 21, a rubber dome 21A, a connector 21B, a switch element 21C, a plunger 22 installed in the case 21, a case cover 23, a guide 24, a packing 25, a presser plate 26, a display device 27, a button 28, a button cover 28A, a lens 29 placed on top of the display device 27, and a curved surface 29A of the lens.

Here, the button 28 has the lens 29 and the button cover 28A. The lens 29 is integrally formed with the button cover 28A and installed on the entire top surface of the button 28. The button cover 28A fixes the button 28 to the presser plate 26. The case 21 contains the rubber dome 21A, the connector 21B, the switch element 21C, and so on. The case cover 23 covers the case 21 and fits in the case 21. The plunger 22 is disposed in the case 21 to move vertically so as to operate the switch element 21C. The guide 24 carries the presser plate 26 and fits on the plunger 22. The packing 25 is sandwiched between the presser plate 26 and the guide 24 so as to serve as a cushion for the presser plate 26 and the guide 24 to fit to each other. The presser plate 26 carries the display device 27 and fits on the guide 24. The display device 27 displays an image or the like, and is sandwiched between the button 28 and the presser plate 26. Although the exemplary push button switch has been described herein, the present invention is not limited thereto and naturally applicable to other types of miniature switches with the display device.

Also in this embodiment, when the frame portion is view from directly above as shown in FIG. 4(a), the refracted light from the light-emitting area provides an image just above the frame portion, so that the frame is made invisible. In addition, when the frame portion is viewed from an oblique direction as shown in FIG. 4(b), an image from the light-emitting area reflected at the inclined surface 9C is seen, so that the frame portion is invisible.

The blast processing is performed desirably on the curved surface 29A formed on the periphery of the top surface of the lens. The blast processing can eliminate the glare at the periphery of the lens to provide the excellent display.

Figure 7:
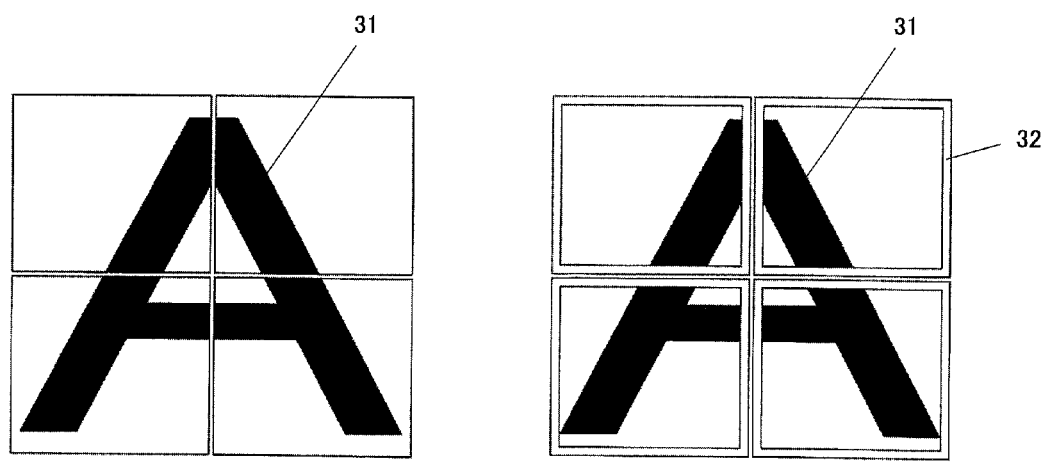
FIG. 7 shows top views each illustrating a display device provided with a plurality of buttons according to the present invention and a display device provided with a plurality of conventional buttons.

FIG. 7 shows top views each illustrating a display device provided with a plurality of buttons according to the present invention and a display device provided with a plurality of conventional buttons, in which FIG. 7(a) is a top view of the display device according to the present invention and FIG. 7(b) is a top view of the conventional display device.

As can be clearly seen from these figures, the conventional display device provides a display mode as shown in FIG. 7(b) where an image 31 is sectioned by frames 32, while the present invention provides an excellent display mode as shown in FIG. 7(a) where the frames that section the image 31 are invisible on the periphery of the lenses.

The present invention should not be limited to the embodiments described above, and a number of variations are possible on the basis of the spirit of the present invention. These variations should not be excluded from the scope of the present invention.

INDUSTRIAL APPLICABILITY

The frameless display device of the present invention is applicable as a frameless display device in which a frame on the periphery of the display portion is made invisible.

What is claimed is:
1. A frameless display device, comprising:
a button having a lens and a button cover; and
a display device provided below the lens,
wherein the lens is disposed on an entire top surface of the button and comprises a curved surface formed on the periphery of the top surface of the lens, a step formed at the periphery of a bottom surface of the lens and abutting against the button cover, and an inclined surface formed at the step and inclined towards the center of the lens, and
wherein a frame on the top surface of the button is made invisible in a display of an image on the top surface of the button.

2. The frameless display device according to claim 1, wherein a blast processing is performed on the curved surface formed on the periphery of the top surface of the lens.

3. The frameless display device according to claim 2, comprising a miniature switch that opens/closes an electric circuit by operating the button.

4. The frameless display device according to claim 3, wherein the miniature switch is a push button switch.

5. The frameless display device according to claim 1, comprising a miniature switch that opens/closes an electric circuit by operating the button.

6. The frameless display device according to claim 5, wherein the miniature switch is a push button switch.

7. The frameless display device according to claim 1, wherein the inclined surface reflects light from the display device in a direction above the center of the lens.

8. The frameless display device according to claim 1, further comprising a depression formed at the center of the bottom surface of the lens.

9. The frameless display device according to claim 8, wherein the curved surface refracts light from the display device in a direction directly above the step.

10. The frameless display device according to claim 9, wherein the inclined surface reflects light from the display device in a direction above the center of the lens.

11. The frameless display device according to claim 8, wherein the inclined surface reflects light from the display device in a direction above the center of the lens.

12. The frameless display device according to claim 1, wherein the curved surface refracts light from the display device in a direction directly above the step.

13. The frameless display device according to claim 12, wherein the inclined surface reflects light from the display device in a direction above the center of the lens.

* * * * *